US012017216B2

(12) United States Patent
Drechsler et al.

(10) Patent No.: US 12,017,216 B2
(45) Date of Patent: Jun. 25, 2024

(54) METHOD AND LABORATORY SYSTEM TO PROCESS A LABORATORY CARRIER BASED ON A FEATURE OF A TEST LIQUID IN THE LABORATORY CARRIER

(71) Applicant: Roche Diagnostics Operations, Inc., Indianapolis, IN (US)

(72) Inventors: Andreas Drechsler, Baar (CH); Darko Klinec, Denzlingen (DE); Michael Koehler, Winnenden (DE); Alexander Jakob, Kornwestheim (DE); Michael Zeder, Buchrain (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 833 days.

(21) Appl. No.: 17/141,786

(22) Filed: Jan. 5, 2021

(65) Prior Publication Data

US 2021/0213450 A1  Jul. 15, 2021

(30) Foreign Application Priority Data

Jan. 10, 2020  (EP) .................................... 20151177

(51) Int. Cl.
*B01L 3/00* (2006.01)
*G01F 23/284* (2006.01)
(Continued)

(52) U.S. Cl.
CPC ...... *B01L 3/502715* (2013.01); *G01F 23/284* (2013.01); *G01F 23/292* (2013.01);
(Continued)

(58) Field of Classification Search
CPC ....... B01L 2300/1861; B01L 3/502715; G01F 23/284; G01F 23/292; G01F 23/804;
(Continued)

(56) References Cited

U.S. PATENT DOCUMENTS 7,693,571 B2   4/2010   Arnone et al.
8,514,393 B2   8/2013   Khan et al.
(Continued)

FOREIGN PATENT DOCUMENTS

DE   102012023947 B4   6/2014
JP   2006-200949 A     8/2006
(Continued)

OTHER PUBLICATIONS

Terasense, Preventive healthcare and blood testing, TeraSense.com, retrieved from http://terasense.com/applications/medical-diagnostics, 1 p.

*Primary Examiner* — Mark R Gaworecki
(74) *Attorney, Agent, or Firm* — Woodard, Emhardt, Henry, Reeves & Wagner, LLP

(57) ABSTRACT

A method to process a laboratory carrier in a laboratory system based on a feature of a test liquid in the laboratory carrier is presented. The laboratory system comprises the laboratory carrier comprising the test liquid, a terahertz wave source, a terahertz detector, a laboratory carrier processing device, and a control unit. Using terahertz technology and data analysis, the feature of the test liquid in the laboratory carrier can be determined. In addition, the control unit controls the laboratory carrier processing device based on the determined feature of the test liquid.

14 Claims, 5 Drawing Sheets

(51) Int. Cl.
   *G01F 23/292* (2006.01)
   *G01F 23/80* (2022.01)
   *G01N 23/20* (2018.01)
   *G01N 23/20091* (2018.01)
   *G01N 35/00* (2006.01)
   *G01N 21/3577* (2014.01)
   *G01N 21/3581* (2014.01)
(52) U.S. Cl.
   CPC ..... *G01F 23/804* (2022.01); *G01N 23/20091* (2013.01); *G01N 35/00732* (2013.01); *B01L 2300/1861* (2013.01); *G01N 21/3577* (2013.01); *G01N 21/3581* (2013.01)
(58) Field of Classification Search
   CPC ........... G01N 21/3577; G01N 21/3581; G01N 23/20091; G01N 35/00732
   See application file for complete search history.

(56) References Cited

U.S. PATENT DOCUMENTS

| | | |
|---|---|---|
| 9,389,172 B2 | 7/2016 | Federicii |
| 2005/0156607 A1 | 7/2005 | Okamura |
| 2007/0195921 A1 | 8/2007 | Ouchi |
| 2007/0228280 A1* | 10/2007 | Mueller ............. G01N 21/3581 |
| | | 250/341.1 |
| 2011/0127433 A1 | 6/2011 | Spennemann et al. |

FOREIGN PATENT DOCUMENTS

| | | |
|---|---|---|
| WO | 2000/050859 A1 | 8/2000 |
| WO | 2003/042670 A1 | 5/2003 |
| WO | 2007/071092 A1 | 6/2007 |

\* cited by examiner

METHOD AND LABORATORY SYSTEM TO PROCESS A LABORATORY CARRIER BASED ON A FEATURE OF A TEST LIQUID IN THE LABORATORY CARRIER

CROSS-REFERENCE TO RELATED APPLICATIONS

This application claims priority to EP 20151177.1, filed Jan. 10, 2020, which is hereby incorporated by reference.

BACKGROUND

The present disclosure generally relates to the field of automated in vitro diagnostic laboratory carrier processing and, in particular, to a method, a laboratory system, a computer program product, and a computer-readable storage medium to process a laboratory carrier based on a feature of a test liquid in the laboratory carrier.

In automated diagnostic laboratory environments, a high number of laboratory carriers comprising test liquids are processed in a cautious and efficient manner in order to produce accurate and reliable test results, which represent pivotal information for physicians. Inaccurate diagnostic tests may lead to incorrect test results or in the worst case to false negative or false positive test results causing misinterpretation of test results, inappropriate further testing, and initiation of treatments with potentially hazardous outcomes for the patient. Typically, automated diagnostic laboratory environments comprise laboratory systems such as pre-analytical, analytical, and post-analytical system for executing test liquid preparation, test liquid analysis, and/or test liquid storage according to predefined laboratory workflows. Accordingly, laboratory carrier processing in a laboratory environment includes operations such as transporting, sorting, capping/de-capping, centrifuging, heating, cooling, storing/archiving, shaking, and identifying of laboratory carriers comprising test liquids as well as pipetting operations like the aspiration and/or dispensation of test liquids out of and/or into laboratory carriers.

For reliable laboratory carrier processing, information about one or more features of the test liquid in the laboratory carrier such as liquid level, volume, leakage, or centrifugation status is essential. For example, for a reliable and accurate pipetting operation an accurate positioning of the pipetting device relative to the test liquid is important so that a correct volume of the test liquid is aspirated. Furthermore, the relative position between the pipetting device and the laboratory carrier is important as a physical contact between a pipette tip of the pipetting device and the laboratory carrier can cause test liquid cross-contamination or damage of the laboratory carrier or pipetting device.

Laser and/or camera based imaging technologies for determining test liquid features in laboratory carriers are well known in the art. However, laser and/or camera based imaging may not provide reliable information about test liquid features in opaque laboratory carries, e.g., if the test liquid in the laboratory carrier is fully or partially covered by a barcode or other labels comprising information of the laboratory carrier and/or test liquid in the laboratory carrier.

A method for determining liquid levels in opaque laboratory carriers using X-ray technology is known. However, radiation of laboratory carries with X-ray may result in damages or analyte degradation in the test liquid causing incorrect test results.

Therefore, there is a need to determine features of a test liquid in a laboratory carrier in a simple, reliable and safe way, thereby better serving the needs of automated in vitro diagnostic laboratory carrier processing.

SUMMARY

According to the present disclosure, a method to process a laboratory carrier in a laboratory system based on a feature of a test liquid in the laboratory carrier is presented. The laboratory system can comprise the laboratory carrier comprising the test liquid, a terahertz wave source, a terahertz detector, a laboratory carrier processing device, and a control unit. The control unit can be communicatively connected to the terahertz wave source, terahertz detector, and laboratory carrier processing device. The method can comprise the following steps: a) placing the laboratory carrier in between the terahertz wave source and terahertz detector, b) irradiating, by the terahertz wave source, the laboratory carrier comprising the test liquid with terahertz waves, c) measuring, by the terahertz detector, intensities of the terahertz radiation reaching the terahertz detector, d) generating, by the control unit, an image comprising different absorption strengths of the irradiated laboratory carrier comprising the test liquid based on the measured intensities of the terahertz radiation reaching the terahertz detector, wherein a first absorption strength range relates to the test liquid, a second absorption strength range relates to the laboratory carrier, and a third absorption strength range relates to air, wherein the first, second, and third absorption strength ranges are different, e) detecting, by the control unit, a liquid outline of the test liquid, a carrier outline of the laboratory carrier, and an air outline based on the first, second, and third absorption strength ranges, f) determining, by the control unit, the feature of the test liquid in the laboratory carrier based on the detected liquid outline, the detected carrier outline, and the detected air outline, and g) controlling, by the control unit, the laboratory carrier processing device to process the laboratory carrier in the laboratory system based on the determined feature of the test liquid in the laboratory carrier.

The present disclosure also relates to a laboratory system. The laboratory system can comprise a laboratory carrier comprising a test liquid, a terahertz wave source, a terahertz detector, a laboratory carrier processing device, and a control unit. The control unit can be communicatively connected to the terahertz wave source, terahertz detector, and laboratory carrier processing device. Additionally, the laboratory system can be configured to execute the steps a) to g) of the method to process the laboratory carrier in the laboratory system based on a feature of the test liquid in the laboratory carrier as described herein.

The present disclosure further relates to a computer program product comprising instructions to cause the laboratory system as described herein to execute the steps of the method to process a laboratory carrier in a laboratory system based on a feature of a test liquid in the laboratory carrier as described herein.

The present disclosure further relates to a computer-readable storage medium having stored thereon the computer program product comprising instructions to cause the laboratory system as described herein to execute the steps of the method to process a laboratory carrier in a laboratory system based on a feature of a test liquid in the laboratory carrier as described herein.

Accordingly, it is a feature of the embodiments of the present disclosure to determine features of a test liquid in a laboratory carrier in a simple, reliable and safe way, thereby better serving the needs of automated in vitro diagnostic laboratory carrier processing. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
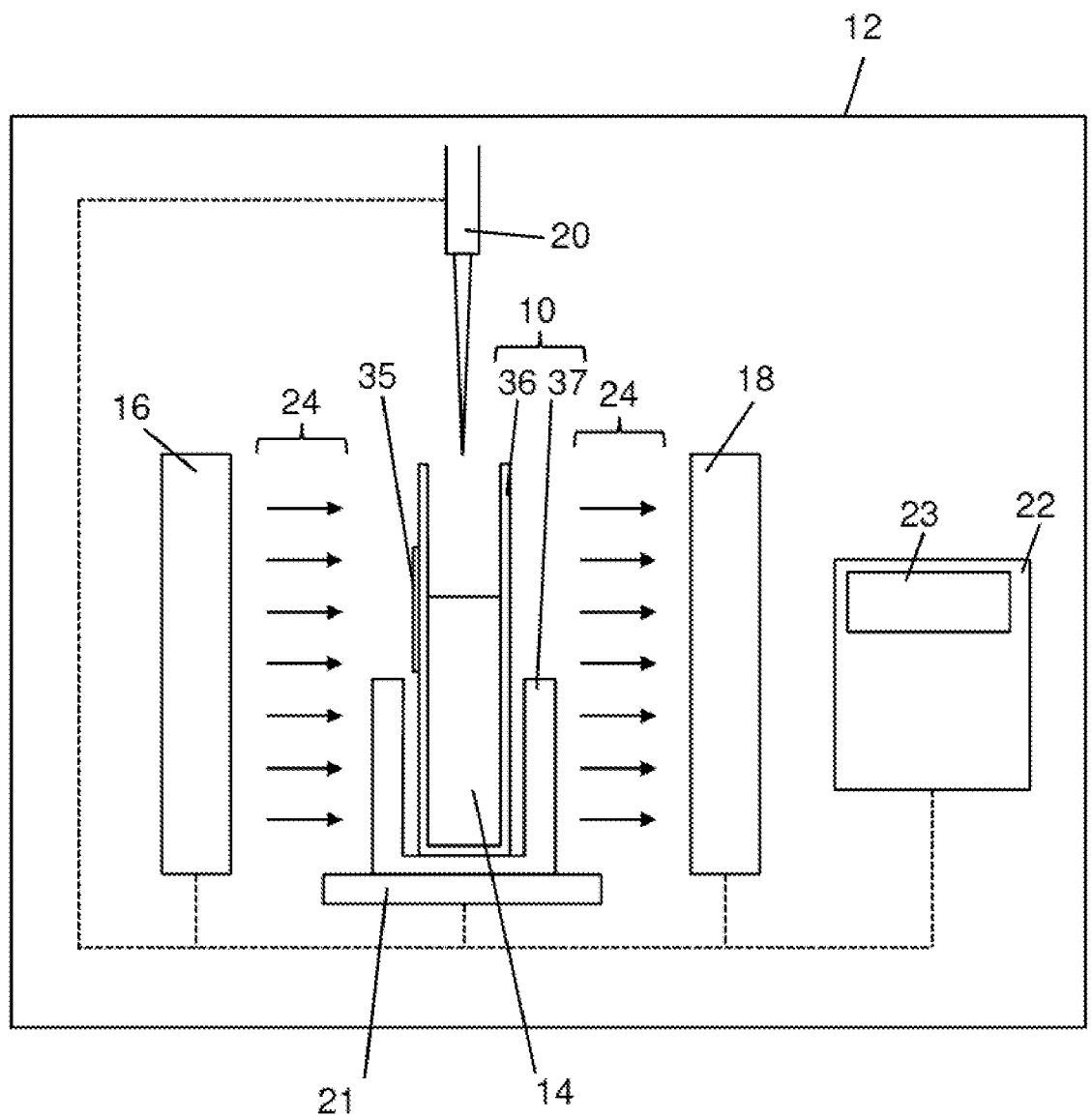
FIG. 1 illustrates a schematic representation of the laboratory system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The present disclosure can relate to a method to process a laboratory carrier in a laboratory system based on a feature of a test liquid in the laboratory carrier. The laboratory system can comprise the laboratory carrier comprising the test liquid, a terahertz wave source, a terahertz detector, a laboratory carrier processing device, and a control unit. The control unit can be communicatively connected to the terahertz wave source, terahertz detector, and laboratory carrier processing device. The method comprises the following steps:
  a) placing the laboratory carrier in between the terahertz wave source and terahertz detector;
  b) irradiating, by the terahertz wave source, the laboratory carrier comprising the test liquid with terahertz waves;
  c) measuring, by the terahertz detector, intensities of the terahertz radiation reaching the terahertz detector;
  d) generating, by the control unit, an image comprising different absorption strengths of the irradiated laboratory carrier comprising the test liquid based on the measured intensities of the terahertz radiation reaching the terahertz detector, wherein a first absorption strength range can relate to the test liquid, a second absorption strength range can relate to the laboratory carrier, and a third absorption strength range can relate to air, wherein the first, second, and third absorption strength ranges can be different;
  e) detecting, by the control unit, a liquid outline of the test liquid, a carrier outline of the laboratory carrier, and an air outline based on the first, second, and third absorption strength ranges;
  f) determining, by the control unit, the feature of the test liquid in the laboratory carrier based on the detected liquid outline, the detected carrier outline, and the detected air outline; and
  g) controlling, by the control unit, the laboratory carrier processing device to process the laboratory carrier in the laboratory system based on the determined feature of the test liquid in the laboratory carrier.

The present disclosure can also relate to a laboratory system. The laboratory system can comprise a laboratory carrier comprising a test liquid, a terahertz wave source, a terahertz detector, a laboratory carrier processing device, and a control unit. The control unit can be communicatively connected to the terahertz wave source, terahertz detector, and laboratory carrier processing device. Additionally, the laboratory system can be configured to execute the steps a) to g) of the above method to process the laboratory carrier in the laboratory system based on a feature of the test liquid in the laboratory carrier as described herein.

The present disclosure can further relate to a computer program product comprising instructions to cause the laboratory system as described herein to execute the steps of the above method to process a laboratory carrier in a laboratory system based on a feature of a test liquid in the laboratory carrier as described herein.

The present disclosure can further relate to a computer-readable storage medium having stored thereon the computer program product comprising instructions to cause the laboratory system as described herein to execute the steps of the above method to process a laboratory carrier in a laboratory system based on a feature of a test liquid in the laboratory carrier as described herein.

The present disclosure can relate to a method to process a laboratory carrier in a laboratory system based on a feature of a test liquid in the laboratory carrier. The laboratory system can comprise the laboratory carrier comprising the test liquid, a terahertz wave source, a terahertz detector, a laboratory carrier processing device, and a control unit. The control unit can be communicatively connected to the terahertz wave source, terahertz detector, and laboratory carrier processing device. The method can comprise the following steps:
  a) placing the laboratory carrier in between the terahertz wave source and terahertz detector;
  b) irradiating, by the terahertz wave source, the laboratory carrier comprising the test liquid with terahertz waves;
  c) measuring, by the terahertz detector, intensities of the terahertz radiation reaching the terahertz detector;
  d) generating, by the control unit, an image comprising different absorption strengths of the irradiated laboratory carrier comprising the test liquid based on the measured intensities of the terahertz radiation reaching the terahertz detector, wherein a first absorption strength range can relate to the test liquid, a second absorption strength range can relate to the laboratory carrier, and a third absorption strength range can relate to air, wherein the first, second, and third absorption strength ranges can be different;
  e) detecting, by the control unit, a liquid outline of the test liquid, a carrier outline of the laboratory carrier, and an air outline based on the first, second, and third absorption strength ranges;

f) determining, by the control unit, the feature of the test liquid in the laboratory carrier based on the detected liquid outline, the detected carrier outline, and the detected air outline; and g) controlling, by the control unit, the laboratory carrier processing device to process the laboratory carrier in the laboratory system based on the determined feature of the test liquid in the laboratory carrier.

As used herein, the term "laboratory system" can relate to a system designed to process a laboratory carrier or a laboratory carrier comprising a test liquid using a laboratory carrier processing device. The laboratory system may be a pre-analytical system, analytical system, post-analytical system, or a laboratory carrier distribution system. The laboratory system may comprise one or more laboratory carrier processing devices. The laboratory carrier processing device may be a pipetting device, a transport system, or a device selected from the group of following devices: a sorting device for sorting laboratory carriers, a cap removal device for removing caps or closures on laboratory carriers, a cap fitting device for fitting caps or closures on laboratory carriers, a cap removal/fitting device for removing/fitting caps or closures on laboratory carriers, a centrifuging device for centrifuging laboratory carriers, an analyzing device for analyzing test liquids in laboratory carriers, a heating device for heating test liquids in laboratory carriers, a cooling device for cooling test liquids in laboratory carriers, a mixing device for mixing test liquids in laboratory carriers, a separation device for isolating analytes of test liquids in laboratory carriers, a storing device for storing laboratory carriers, an archiving device for archiving laboratory carriers, a laboratory carrier type determination device for determining laboratory carrier types, a test liquid quality determination device for determining test liquid qualities in laboratory carriers, a laboratory carrier identification device for identifying laboratory carriers.

As used herein, the term "laboratory carrier" can relate to a device configured for receiving, holding, transporting, and/or releasing a test liquid. In one embodiment, the laboratory carrier can be fully or partially opaque so that the feature of the test liquid in the laboratory carrier may not be visible when imaging the laboratory carrier comprising the test liquid with electromagnetic waves having a wavelength between 400 nm and 1550 nm. In one embodiment, the laboratory carrier can comprise a test liquid container configured for receiving, holding, transporting, and/or releasing the test liquid. The test liquid container may be, as non-limiting examples, a test liquid vessel or test liquid tube. In one embodiment, the laboratory carrier can comprise a test liquid container configured for receiving, holding, transporting, and/or releasing the test liquid and a container holder configured for receiving, holding, transporting, and/or releasing the test liquid container. The test liquid container, the container holder, or both may be fully or partially opaque. The container holder may be, as non-limiting examples, a test liquid vessel rack or test liquid vessel transportation device. In one specific embodiment, the container holder can be a transportation device comprising at least one magnetically active device, which can interact with a magnetic field so that a magnetic force can be applied to the container holder. A container holder comprising at least one magnetically active device, which can interact with a magnetic field is well known in the art and may be designed as described in EP2988134A1 or as described in EP3070479A1, which are hereby incorporated by reference. In another specific embodiment, the container holder can be a transportation device comprising motor-driven wheels. A container holder comprising motor-driven wheels is well known in the art and may be designed as described in U.S. Pat. No. 9,182,419B2, which is hereby incorporated by reference. In another specific embodiment, the container holder can be a transportation device configured to be transported on a conveyor system comprising a transport surface comprising one or more conveyor belts to move and stop the transportation device on the transport surface.

In one embodiment, the test liquid container, the container holder, or both can be made of an opaque material or can be made of transparent material covered by an opaque material. In a more specific embodiment, the opaque material can be paper, plastic or metal. For example, one or more paper labels can be attached to the test liquid container or the test liquid container may be made of non-transparent or colored plastic so that the test liquid can be fully or partially covered. And/or the container holder holding the test liquid container may be made of a non-transparent or colored plastic or metal so that the test liquid can be fully or partially covered.

In one embodiment, the test liquid can be a biological liquid, a test reagent, or a mixture of a biological liquid and test reagent. As used herein, the term "biological liquid" can relate to a patient's specimen (e.g., serum, plasma, whole blood, urine, sputum, cerebrospinal fluid, bone marrow, and the like) from which the presence and, if desired, the concentration of an analyte or analyte related parameter can be determined using a test reagent. Typically, a test reagent can comprise a substance or solution that can react with a certain analyte or analyte-related substance in the biological liquid in order to generate a measurable signal indicative of the presence and/or concentration of the analyte in the biological liquid.

As used herein, the term "terahertz wave source" can relate to a device designed to generate terahertz waves within a certain wavelength range. Such terahertz wave sources are well known in the art. Using terahertz radiation for determining a feature of a test liquid in a laboratory carrier is harmless for the test liquid due to the non-ionizing nature of terahertz waves. In one embodiment, the terahertz waves can have a wavelength range between about 30 μm (10 THZ) and about 3 mm (0.1 THZ). In a more specific embodiment, the terahertz waves can have a wavelength range between about 176 μm (1.7 THZ) and about 1.5 mm (0.2 THZ). In a further more specific embodiment, the terahertz waves can have a wavelength range between about 200 μm (1.5 THZ) and about 300 μm (1 THZ). In one embodiment, the terahertz wave source can have an output power of at least 100 mW. In another embodiment, the terahertz wave source can have an output power of at least 250 mW.

As used herein, the term "terahertz detector" can relate to a device designed to measure intensities of the terahertz radiation. Such terahertz detectors are well known in the art. In one embodiment, the terahertz detector can comprise a detection area, wherein the terahertz detector can be configured to measure intensities of the terahertz radiation within the detection area. Subsequently, the measured intensities can be transmitted to the control unit for converting the measured intensities into absorption strengths. In addition, the generated image can correspond to the detection area of the terahertz detector and can comprise an area comprising different absorption strengths of the irradiated laboratory carrier comprising the test liquid.

As used herein, the term "placing in between" can mean that the laboratory carrier can be positioned in relation to the terahertz wave source and terahertz detector so that that the laboratory carrier can be irradiated with terahertz waves and that terahertz waves which have not been absorbed by the laboratory carrier can reach the terahertz detector. Accordingly, the laboratory carrier can be positioned in an optical path of terahertz waves between the terahertz wave source and terahertz detector, wherein the optical path of terahertz waves may be linear or may possess any geometric form.

In one embodiment, the laboratory system can comprise a transport system configured to place the laboratory carrier in between the terahertz wave source and terahertz detector in step a) of the method.

In one embodiment, the terahertz detector can comprise a detection line and the terahertz detector can be configured to measure intensities of the terahertz radiation on the detection line. The laboratory carrier may be static between the terahertz wave source and the terahertz detector and the generated image can correspond to the detection line and can comprise a line comprising different absorption strengths of the irradiated laboratory carrier comprising the test liquid. Alternatively, the laboratory carrier may be moved by a transport system in a predefined direction during steps b) and c) of the method. The generated image can correspond to a set or collection of detection lines and can comprise a set or collection of lines forming an area comprising different absorption strengths of the irradiated laboratory carrier comprising the test liquid.

In one embodiment, the terahertz detector can comprise a detection point and the terahertz detector can be configured to measure an intensity of the terahertz radiation on the detection point. In one embodiment, the laboratory carrier may be moved by a transport system in a predefined direction during steps b) and c) of the method. In addition, the generated image can correspond to a set or collection of detection points and can comprise a set or collection of points forming a line comprising different absorption strengths of the irradiated laboratory carrier comprising the test liquid. In another embodiment, the laboratory carrier may be moved by a transport system in a first predefined direction and a second predefined direction during steps b) and c) of the method, wherein the second predefined direction can be substantially perpendicular to the first direction. In addition, the generated image can correspond to a set or collection of detection points and can comprise a set or collection of points forming an area comprising different absorption strengths of the irradiated laboratory carrier comprising the test liquid.

The term "control unit" as used herein can encompass any physical or virtual processing device comprising a processor, which can be configured to control the laboratory system in a way that a laboratory carrier can be processed, based on a determined feature of a test liquid in the laboratory carrier. For example, the control unit may receive measured intensities from the terahertz detector and can generate an image comprising different absorption strengths of the irradiated laboratory carrier comprising the test liquid based on measured intensities of the terahertz radiation reaching the terahertz detector. In one embodiment, generating the image may comprise enhancing image contrasts for a better distinction between the different absorption strengths. The control unit may determine different absorption strength ranges based on predefined threshold values. For example, a first upper and lower threshold value may define a first absorption strength range relating to the test liquid, a second upper and lower threshold value may define a second absorption strength range relating to the laboratory carrier, and a third upper and lower threshold value may define a third absorption strength relating to air. The control unit can detect a liquid outline of the test liquid, a carrier outline of the laboratory carrier, and an air outline based on different absorption strength ranges relating to the different absorption properties of the test liquid, laboratory carrier, and air. The term "outline" as used herein can relate to the outer limit or border of an image area comprising a certain absorption strength range within the generated image. As the laboratory carrier, the test liquid, and air can have different absorption properties and can absorb the intensity of the terahertz waves differently, the resulting image areas with different absorption strength ranges in the image can be defined by outlines or the image areas comprising different absorption strength ranges in the image can be "outlined" by the control unit. The control unit can determine a feature of the test liquid in the laboratory carrier based on the detected outlines and can control the laboratory carrier processing device to process the laboratory carrier in the laboratory system based on the determined feature as further described below. The control unit may receive information from a management unit regarding the laboratory carrier and/or test liquid, which may need to be processed in the laboratory system. The processor of the control unit may, for instance, be embodied as a programmable logic controller configured to execute a computer-readable program stored on a computer-readable storage medium provided with instructions to cause the laboratory system as described herein to execute steps a) to g) of the method to process a laboratory carrier in a laboratory system based on a feature of a test liquid in the laboratory carrier. The control unit may further comprise a user interface for displaying and/or entering information regarding laboratory carriers and/or corresponding test liquids, which have to be processed.

The term "feature" as used herein can relate to a physical property, condition or status of the test liquid in the laboratory carrier.

In one embodiment, the feature of the test liquid in the laboratory carrier can relate to a test liquid level. In addition, in step f) the test liquid level can be determined based on a common interface of the liquid outline and the air outline. The test liquid level can indicate the level of the liquid in the laboratory carrier. The common interface of the liquid outline and the air outline can be substantially horizontal with respect to gravity.

In a further embodiment, the carrier outline can comprise a bottom and two opposing sidewalls. Moreover, step f) can further comprise determining, by the control unit, the position of the test liquid level based on a distance between the determined test liquid level and the bottom of the carrier outline.

In another further embodiment, the carrier outline can comprise a bottom and two opposing sidewalls, each comprising a top end. In addition, step f) further comprise determining, by the control unit, the position of the test liquid level based on a distance between the determined test liquid level and the two top ends of the carrier outline.

In one embodiment, the control unit can control the processing device to process the laboratory carrier based on the determined liquid level as further described below.

In one embodiment, the laboratory carrier can comprise a test liquid container configured for receiving, holding, transporting, and/or releasing the test liquid. The test liquid level can relate to a test liquid level in a specific test liquid container type. Moreover, step f) can further comprise determining, by the control unit, the specific test liquid container type based on a dimension and/or a geometric form of the carrier outline, wherein the dimension and/or the geometric form can be specific for the specific test liquid container type.

In one embodiment, the test liquid level can relate to a test liquid level in a specific test liquid container type. Moreover, step f) can further comprise determining, by the control unit, the specific test liquid container type based on the second absorption strength range, wherein the second absorption strength range can be specific for the specific test liquid container type.

In a further embodiment, the second absorption strength range can comprise two or more sub-ranges forming an absorption strength pattern. Moreover, step f) can further comprise determining, by the control unit, the specific test liquid container type based on the absorption strength pattern, wherein the absorption strength pattern can be specific for the specific test liquid container type.

In one embodiment, the control unit can comprise a memory device. Specific dimensions of carrier outlines, geometric forms of carrier outlines, second absorption strength ranges, and/or absorption strength patterns for specific test liquid container types can be stored in the memory device. The control unit can compare the stored specific dimensions of carrier outlines, geometric forms of carrier outlines, second absorption strength ranges, and/or absorption strength patterns with the dimension of the carrier outline, geometric form of the carrier outline, second absorption strength, and/or absorption strength pattern of the test liquid container for determining the specific test liquid container type.

In an alternative embodiment, the control unit can send information about the dimension of the carrier outline, geometric form of the carrier outline, second absorption strength range, and/or absorption strength pattern of the test liquid container to a laboratory management unit communicatively connected to the control unit of the laboratory system. The laboratory management unit can comprise a memory device. Specific dimensions of carrier outlines, geometric forms of carrier outlines, second absorption strength ranges, and/or absorption strength patterns for specific test liquid container types can be stored in the memory device. The laboratory management unit can compare the stored specific dimensions of carrier outlines, geometric forms of carrier outlines, second absorption strength ranges, and/or absorption strength patterns with the received dimension of the carrier outline, geometric form of the carrier outline, second absorption strength range, and/or absorption strength pattern for determining the specific test liquid container type. In addition, the laboratory management unit can send information about the specific test liquid container type to the control unit of the laboratory system.

In one embodiment, the control unit can control the processing device to process the laboratory carrier based on the determined liquid level and the determined specific test liquid container type as further described below.

In one embodiment, the control unit can send information about the determined test liquid level and specific test liquid container type to a laboratory management unit communicatively connected to the control unit of the laboratory system and to further control units of further laboratory systems. Information about the determined test liquid level and specific test liquid container type can be retrieved from the laboratory management unit by a further control unit of a further laboratory system. In addition, the further control unit of the further laboratory system can control a processing device of the further laboratory system to process the laboratory carrier based on the retrieved information.

In another embodiment, the laboratory carrier can comprise a test liquid container configured for receiving, holding, transporting, and/or releasing the test liquid. In addition, the feature of the test liquid in the laboratory carrier can relate to a test liquid volume. The test liquid container can comprise a substantially horizontal cross-section and the horizontal cross-section of the test liquid container can be circular or quadratic. The detected liquid outline can define a liquid area and, in step f), the liquid volume in the laboratory carrier can be determined based on the defined liquid area and the horizontal cross-section.

In an alternative embodiment, the laboratory carrier can comprise a test liquid container configured for receiving, holding, transporting, and/or releasing the test liquid. In addition, the feature of the test liquid in the laboratory carrier can relate to a test liquid volume. The test liquid container can comprise a substantially horizontal cross-section and the horizontal cross-section of the test liquid container can be circular or quadratic. The detected liquid outline can comprise a test liquid level. In step f), the test liquid level can be determined based on a common interface of the liquid outline and the air outline. The test liquid level and the detected carrier outline can define a liquid area. Moreover, in step f), the liquid volume in the laboratory carrier can be determined based on the defined liquid area and the horizontal cross-section.

In one embodiment, the control unit can control the processing device to process the laboratory carrier based on the determined test liquid volume as further described below.

In a specific embodiment, the defined liquid area can comprise an absorption strength profile along an axis substantially perpendicular to a vertical axis of the test liquid container. The vertical axis of the test liquid container can be substantially parallel to gravity. In addition, the method can further comprise determining, by the control unit, if the horizontal cross-section of the test liquid container is circular or quadratic based on the absorption strength profile. The cross-section can be circular if the absorption strength profile comprises an increase and a decrease of the absorption strength. Alternatively, the cross-section can be quadratic if the absorption strength profile is linear.

In an alternative specific embodiment, the carrier outline can comprise a dimension and/or a geometric form of the test liquid container. Moreover, the method can further comprise determining, by the control unit, a test liquid container type based on the dimension and/or the geometric form of the test liquid container. The dimension and/or geometric form can be specific for the specific test liquid container type. The method can further comprise determining, by the control unit, if the horizontal cross-section of the test liquid container is circular or quadratic based on the determined test liquid container type.

Alternatively, the test liquid container type may be determined by the second absorption strength range and/or absorption strength pattern as described above for determining if the horizontal cross-section of the test liquid container is circular or quadratic.

In one embodiment, the test liquid container can comprise a cap. The detected carrier outline comprises a dimension and/or a geometric form of the cap. Moreover, the method can further comprise determining, by the control unit, that the test liquid container is capped based on the detected carrier outline.

In one embodiment, the control unit can control the processing device to process the laboratory carrier based on whether the test liquid container is capped or not as further described below.

In another embodiment, the test liquid container can comprise a cap. The detected carrier outline can comprise a dimension and/or a geometric form of the cap. Moreover, the method can further comprise determining, by the control unit, a test liquid container type based on the dimension and/or the geometric form of the cap.

Alternatively or additionally, the second absorption strength may comprises two or more sub-ranges forming a absorption strength pattern of the cap and the test liquid container type may be determined by the absorption strength pattern of the cap.

After determining the test liquid container type based on the dimension of the cap, the geometric form of the cap, and/or absorption strength pattern of the cap, the control unit may further determine a test liquid level in a specific test liquid container type based on the determined test liquid container type. Alternatively, the control unit may further determine if the horizontal cross-section of the test liquid container is circular or quadratic based on the determined test liquid container type.

In one embodiment, the control unit can control the processing device to process the laboratory carrier based on the determined test liquid container type as further described below.

In one embodiment, the feature of the test liquid in the laboratory carrier can relate to a test liquid leakage. In step f), the test liquid leakage can be determined by localizing one or more detected liquid outlines outside of the detected carrier outline.

In a specific embodiment, the method can further comprise displaying, by the control unit, a notification comprising information about a potential contamination risk, potential test liquid processing error, or potential damage of the test liquid container on a user interface of the control unit if a test leakage was determined.

Accordingly, an operator of the laboratory system can be informed to initiate appropriate measures such as visual inspection or removal of the laboratory carrier for preventing contamination of the laboratory system or cross-contamination of test liquids processed on the laboratory system.

In one embodiment, the control unit can control the processing device to process the laboratory carrier based on the determined test liquid leakage as further described below.

In one embodiment, the feature of the test liquid in the laboratory carrier can relate to a centrifugation status of the test liquid in the laboratory carrier. In step e), one or more liquid outlines can be detected. The largest liquid outline of the one or more liquid outlines can comprise a test liquid level. In step f), the test liquid level can be determined by a common interface of the largest liquid outline and air outline. Additionally, in step f), the centrifugation status can be determined based on the number and localization of the detected liquid outlines in relation to the test liquid level.

In one embodiment, the centrifugation status can comprise one of the following two statuses 1) the test liquid is centrifuged if only one liquid outline comprising the test liquid level was detected within the detected carrier outline or 2) the test liquid is not centrifuged if one liquid outline comprising the test liquid level and at least one further liquid outline localized at the inner carrier outline and above the test liquid level were detected.

For example, during transportation of the laboratory carrier, the test liquid may be shaken so that drops of the test liquid are spilled to the sidewalls of the laboratory carrier. Accordingly, the laboratory carrier comprising the test liquid may need to be centrifuged before further processing.

In an alternative embodiment, the feature of the test liquid in the laboratory carrier can relate to a centrifugation status of the test liquid in the laboratory carrier. The test liquid can be a biological liquid. The biological liquid can comprise plasma and red blood cells forming a plasma section outlined by a liquid outline and a cruor outlined by a liquid outline during centrifugation. In step e), one or more liquid outlines can be detected. In addition, in step f), the centrifugation status can be determined based on the number of detected liquid outlines and the absorption strength sub-ranges within the detected liquid outlines.

In one embodiment, the centrifugation status can comprise one of the following two statuses 1) the biological liquid is not centrifuged if one liquid outline was detected in the detected carrier outline or two liquid outlines with two different absorption strength sub-ranges within the first absorption strength range were detected in the detected carrier outline, wherein the difference between the two absorption strength sub-ranges is below a threshold value or 2) the biological liquid is centrifuged if two liquid outlines with two different absorption strength sub-ranges within the first absorption strength range were detected in the detected carrier outline, wherein the difference between the two absorption strength sub-ranges is above a threshold value.

As the plasma and the cruor of the biological liquid have different absorption properties and absorb the intensity of the terahertz waves differently, the resulting first absorption strength range of the biological liquid can comprise two different absorption strength sub-ranges. A first liquid outline can be detected for the plasma section based on a first absorption strength sub-range and a second liquid outline can be detected for the cruor based on a second absorption strength sub-range. The second absorption strength sub-range can decrease with an increased density of red blood cells forming the cruor. Thus, the test liquid can be centrifuged if the second absorption strength sub-range within the second liquid outline outlining the cruor is below a threshold value or if the difference of the two absorption strength sub-ranges within the two detected liquid outlines is above a threshold value. If a laboratory carrier comprising the test liquid is stored for a certain time period, a cruor slowly can start to form based on sedimentation of red blood cells. However, during storage, the density of red blood cells within a slowly forming cruor of the test liquid can be lower compared to the density of red blood cells of a fully formed cruor after centrifugation. Accordingly, if the second absorption strength sub-range within the second liquid outline outlining a not fully formed cruor is above a threshold value or if the difference of the two absorption strength sub-ranges within the two detected liquid outlines is below a threshold value, the test liquid may not be centrifuged.

In one embodiment, the feature of the test liquid in the laboratory carrier can relate to a centrifugation status of the test liquid in the laboratory carrier. The test liquid can be a biological liquid. The laboratory carrier can further comprise a separator configured to form a physical barrier between serum or plasma outlined by a liquid outline and red blood cells outlined by a liquid outline during centrifugation. The detected carrier outline can comprise a separator outline. In step e), one or more liquid outlines and the separator outline can be detected based on the first and second absorption strength ranges. In addition, in step f), the centrifugation status can be determined based on the number of detected liquid outlines and based on the localization of the detected separator outline in relation to the one or more liquid outlines.

In one embodiment, the centrifugation status can comprise one of the following two statuses: 1) the biological liquid is not centrifuged if one liquid outline was detected and the separator outline is located below or above the detected liquid outline or 2) the biological liquid is centrifuged if two liquid outlines were detected and the two detected liquid outlines are separated by the separator outline.

In a specific embodiment, the separator can be made of a gel, glass, or plastic.

In a specific embodiment, the method can further comprise displaying, by the control unit, a notification indicating the centrifugation status of the test liquid on a user interface of the control unit after determining the centrifugation status.

Accordingly, the user can be informed to initiate appropriate measures such as visual inspection or removal of the laboratory carrier for preventing processing of not centrifuged test liquids, which may cause erroneous test results.

In one embodiment, the control unit can control the processing device to process the laboratory carrier based on the determined centrifugation status as further described below.

In one embodiment, the laboratory carrier processing device can be a pipetting device and processing of the laboratory carrier can comprise the aspiration and/or dispensing of the test liquid out and/or in the laboratory carrier.

In a specific embodiment, the determined feature of the test liquid in the laboratory carrier can relate to a test liquid level or a test liquid level in a specific laboratory carrier type as described above. The control unit can control the movement of the pipetting device in order to position the pipetting device for aspirating and/or dispensing the test liquid out and/or in the laboratory carrier based on the determined test liquid level. Accordingly, a predefined volume of the test liquid can be removed from the laboratory carrier and/or the test liquid can be mixed in the laboratory carrier. Thus, the aspiration and/or dispensing of air causing erroneous test results can be prevented. Furthermore, the control unit may control the movement of the pipetting device based on the determined carrier outline or determined test liquid container type so that a physical contact between the pipette tip of the pipetting device and the laboratory carrier can be prevented.

In a further specific embodiment, the determined feature of the test liquid in the laboratory carrier can relate to a test liquid volume as described above. The control unit can control the pipetting device to aspirate a predefined volume of the test liquid volume out of the laboratory carrier based on the determined test liquid volume. For example, a determined test liquid volume may be aliquoted into a predefined number of aliquots of a predefined volume. Alternatively, the control unit can control the pipetting device not to aspirate a predefined volume of the test liquid volume out of the laboratory carrier based on the determined test liquid volume. For example, if a certain predefined volume required for a certain test is not available in the laboratory carrier, the control unit may not position the pipetting device for aspirating the test liquid. Thus, only laboratory carriers comprising a test liquid of sufficient volume can be processed, which may improve the throughput of the laboratory system.

In a further embodiment, the pipetting device can comprise a pipette tip and step g) of the method can further comprise
controlling, by the control unit, the movement of the pipetting device so that the pipette tip is positioned in between the terahertz wave source and terahertz detector during the aspiration and/or dispensing of the test liquid out and/or in the laboratory carrier, irradiating, by the terahertz wave source, the laboratory carrier comprising the test liquid and the pipette tip with terahertz waves, measuring, by the terahertz detector, intensities of the terahertz radiation reaching the terahertz detector, generating, by the control unit, an image comprising different absorption strengths of the irradiated laboratory carrier comprising the test liquid and the pipette tip based on the measured intensities of the terahertz radiation reaching the terahertz detector, wherein a first absorption strength range can relate to the test liquid, a second absorption strength range can relate to the laboratory carrier, a third absorption strength range can relate to air, and a fourth absorption strength range can relate to the pipette tip, wherein the first, second, third, and fourth absorption strength ranges can be different, detecting, by the control unit, a liquid outline of the test liquid, a carrier outline of the laboratory carrier, an air outline, and a pipette tip outline based on the first, second, third, and fourth absorption strength ranges, determining, by the control unit, the position of the pipette tip outline, the liquid outline, the carrier outline, and/or the air outline, and monitoring, by the control unit, the position of the pipette tip outline in relation to the positions of the liquid outline, the carrier outline, and/or the air outline during the aspiration and/or dispensing of the test liquid out and/or in the laboratory carrier by repeating the aforementioned steps.

Accordingly, the movements of the pipetting device can be monitored in order to assure a reliable operation of the pipetting device. For example, if the position of the pipette tip in relation to the test liquid or laboratory carrier is outside of required specification ranges appropriate measures, e.g., calibration of the pipetting device can be initiated to adjust the movements of the pipetting device before erroneous aspiration/dispensing of test liquid or contact with the laboratory carrier occurs.

In one embodiment, the determined feature of the test liquid in the laboratory carrier can relate to a test liquid leakage as described above. The control unit can control the pipetting device not to aspirate and/or dispense a predefined volume of the test liquid out and/or in the laboratory carrier based on the determined test liquid leakage. For example, test liquid leakage may be an indicator of damaged laboratory carriers or cross-contaminated test liquids. Thus, only undamaged laboratory carriers comprising a test liquid can be processed, which may improve the throughput of the laboratory system.

In one embodiment, the determined feature of the test liquid in the laboratory carrier can relate to a centrifugation status as described above. The control unit can control the pipetting device to aspirate or not to aspirate a predefined volume of the test liquid out of the laboratory carrier based on the determined centrifugation status. Depending on the ordered test, centrifugation can be essential for producing a reliable test result. If centrifugation of the test liquid is required, the control unit can control the pipetting device to aspirate a predefined volume of the test liquid out of the laboratory carrier only if the laboratory carrier comprising the test liquid is centrifuged. Alternatively, the control unit can control the pipetting device not to aspirate a predefined volume of the test liquid out of the laboratory carrier if the laboratory carrier comprising the test liquid is not centrifuged.

In one embodiment, the laboratory carrier processing device can be a transport system configured to transport the laboratory carrier. The processing of the laboratory carrier can comprise the transportation of the laboratory carrier to a dedicated place of the laboratory system. The transport system may be, as non-limiting example, a robotic arm, a conveyer system comprising a transport surface comprising one or more conveyor belts to move and stop the laboratory carrier on the transport surface, a system comprising a stable transport surface on which a self-propelled laboratory carrier can move, or a laboratory transport system comprising a number of electro-magnetic actuators being stationary arranged below the transport surface and configured to generate magnetic fields to move the laboratory carrier on the transport surface as disclosed in EP2566787B1, which is hereby incorporated by reference. The dedicated place may be, as non-limiting example, an error handling area or another laboratory carrier processing device such as a centrifuge or a decapper of the laboratory system. The error handling area may be designed for removing the laboratory carrier from the laboratory system or may be designed for visual inspection of the laboratory carrier by an operator.

In a specific embodiment, the determined feature of the test liquid in the laboratory carrier can relate to a test liquid level as described above. In addition, the control unit can control the transport system to transport the laboratory carrier to an error handling area of the laboratory system if the test liquid level is below a predefined threshold. Alternatively, the control unit can control the transport system to transport the laboratory carrier to a pipetting device or analyzing device only if the test liquid level is above a predefined threshold.

In a further specific embodiment, the determined feature of the test liquid in the laboratory carrier can relate to a test liquid volume as described above. In addition, the control unit can control the transport system to transport the laboratory carrier to the error handling area of the laboratory system if the test liquid volume is below a predefined threshold. Alternatively, the control unit can control the transport system to transport the laboratory carrier to a pipetting device or analyzing device only if the test liquid volume is above a predefined threshold.

In a further specific embodiment, the determined feature of the test liquid in the laboratory carrier can relate to a test liquid leakage as described above. In addition, the control unit can control the transport system to transport the laboratory carrier to the error handling area of the laboratory system if a test liquid leakage was determined. Accordingly, a potential contamination of laboratory system can be prevented.

In a further specific embodiment, the feature of the test liquid in the laboratory carrier can relate to a centrifugation status as described above. In addition, the control unit can control the transport system to transport the laboratory carrier to a centrifuge of the laboratory system if the centrifugation status indicates that the test liquid is not centrifuged.

In a further specific embodiment, the test liquid container can be capped as described above. In addition, the control unit can control the transport system to transport the laboratory carrier to the decapper of the laboratory system.

The present disclosure can also relate to a laboratory system. The laboratory system can comprise a laboratory carrier comprising a test liquid, a terahertz wave source, a terahertz detector, a laboratory carrier processing device, and a control unit. The control unit can be communicatively connected to the terahertz wave source, terahertz detector, and laboratory carrier processing device. Additionally, the laboratory system can be configured to execute the steps a) to g) of the method to process the laboratory carrier in the laboratory system based on a feature of the test liquid in the laboratory carrier as described herein.

The present disclosure can further relate to a computer program product comprising instructions to cause the laboratory system as described herein to execute the steps of the method to process a laboratory carrier in a laboratory system based on a feature of a test liquid in the laboratory carrier as described herein.

The present disclosure can further relates to a computer-readable storage medium having stored thereon the computer program product comprising instructions to cause the laboratory system as described herein to execute the steps of the method to process a laboratory carrier in a laboratory system based on a feature of a test liquid in the laboratory carrier as described herein.

Referring initially to FIG. 1, In FIG. 1 a schematic representation of an embodiment of a laboratory system (12) is shown. The shown laboratory system (12) can comprise a laboratory carrier (10) comprising a test liquid (14), a terahertz wave source (16), a terahertz detector (18), two laboratory carrier processing devices (20, 21), and a control unit (22). The shown laboratory carrier (10) can comprise a test liquid container (36) configured for receiving, holding, transporting, and/or releasing the test liquid (14) and a container holder (37) configured for receiving, holding, transporting, and/or releasing the test liquid container (36). The test liquid container (36), the container holder (37), or both may be fully or partially opaque. For example, one or more paper labels (35) may be attached to the test liquid container (36) as shown in FIG. 1. Additionally or alternatively, the test liquid container (36) may be made of non-transparent plastic. Additionally or alternatively, the container holder (37) may be made of non-transparent plastic or metal. In the shown embodiment, the laboratory carrier (10) can be placed in between the terahertz wave source (16) and terahertz detector (18) by a transport system (21). The terahertz wave source (16) can irradiate the laboratory carrier (10) comprising the test liquid (14) with terahertz waves (24) and the terahertz detector (18) can measure intensities of the terahertz radiation reaching the terahertz detector (18). Besides placing the laboratory carrier (10) between the terahertz wave source (16) and terahertz detector (18), the transport system (21) may also transport the laboratory carrier (10) to a dedicated place of the laboratory system (12), such as, for example, an error handling area, a centrifuge, or a decapper of the laboratory system (not shown). Thus, the transport system (21) can be one of the two laboratory carrier processing devices of the laboratory system (12). The shown laboratory system (12) can comprise also a pipetting device (20) as a further laboratory carrier processing device. As shown in FIG. 1, the control unit (22) can be communicatively connected to the terahertz wave source (16), terahertz detector (18), and laboratory carrier processing devices (20, 21) as indicated by dashed lines. The shown control unit (22) can further comprise a user interface (23) for displaying and/or entering information regarding the laboratory carrier (10) and/or test liquid (14).

Figure 2A:
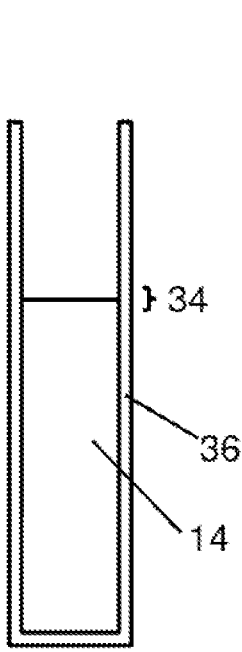
FIGS. 2A-2F illustrate schematic representations of two embodiments of test liquid features determined by detected liquid outlines, detected carrier outlines, and detected air outlines according to the present disclosure.
Figure 2B:
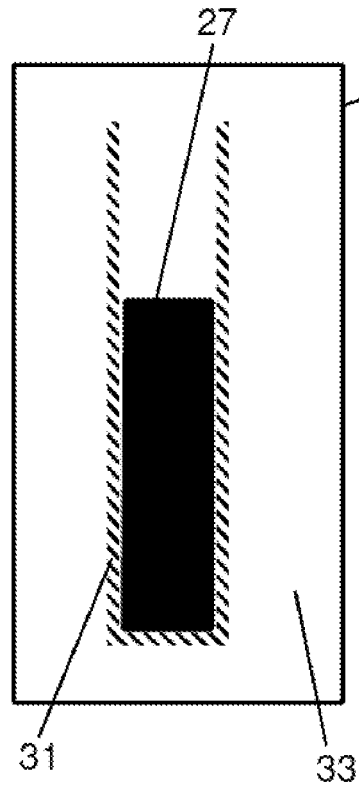
Figure 2C:
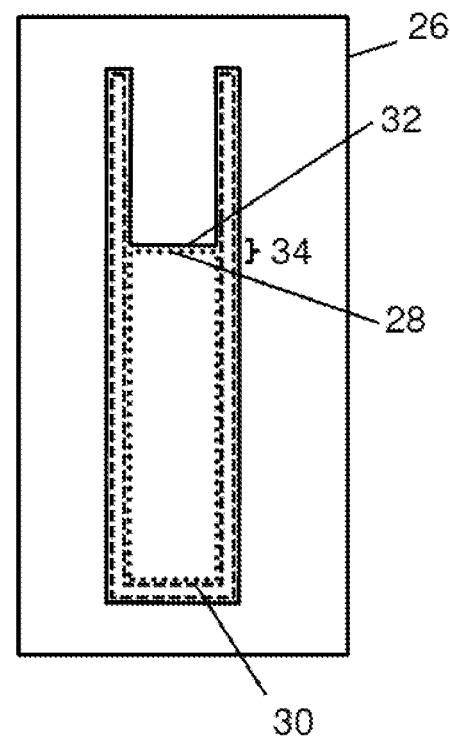
Figure 2D:
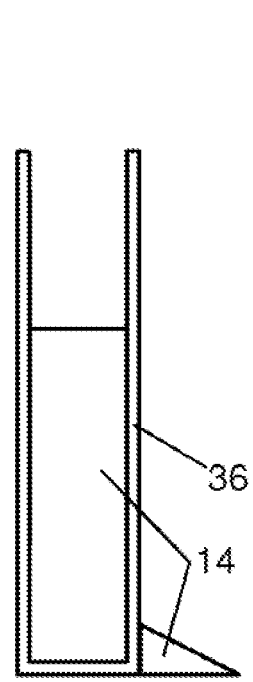

FIG. 2A-F show schematic representations of two embodiments of test liquid features determined by detected liquid outlines (28, 29), detected carrier outlines (30), and detected air outlines (32). For simplification, FIGS. 2A and 2D show a laboratory carrier (10) comprising only a test liquid container (36). Alternatively, the laboratory carrier (10) may comprise a test liquid container (36) and a container holder (37) as shown in FIG. 1.

FIG. 2A shows a test liquid container (36) comprising a test liquid (14) with a certain test liquid level (34). FIG. 2B shows a generated image (26) comprising different absorption strength ranges (27, 31, 33) of the irradiated test liquid container (36) comprising the test liquid (14) as shown in FIG. 2A. A first absorption strength range (27) can relate to the test liquid (14), a second absorption strength range (31) can relate to the test liquid container (36), and a third absorption strength range (33) can relate to air. The first, second, and third absorption strength ranges (27, 31, 33) can be different as indicated by the black, shaded and white areas. FIG. 2C shows the image (26) with a detected liquid outline (28) of the test liquid (14) as indicated by a dotted line, a carrier outline (30) of the test liquid container (36) as indicated by a dashed line, and an air outline (32) as indicated by a solid line. As shown in FIG. 2C, the test liquid level (34) can be located at a common interface of the liquid outline (28) and the air outline (32).

Figure 2E:
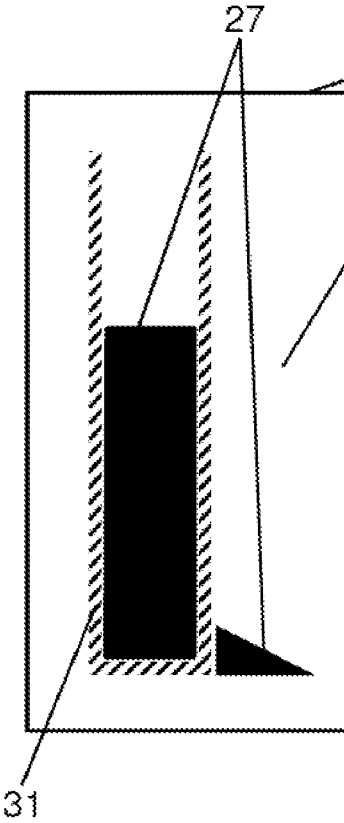
Figure 2F:
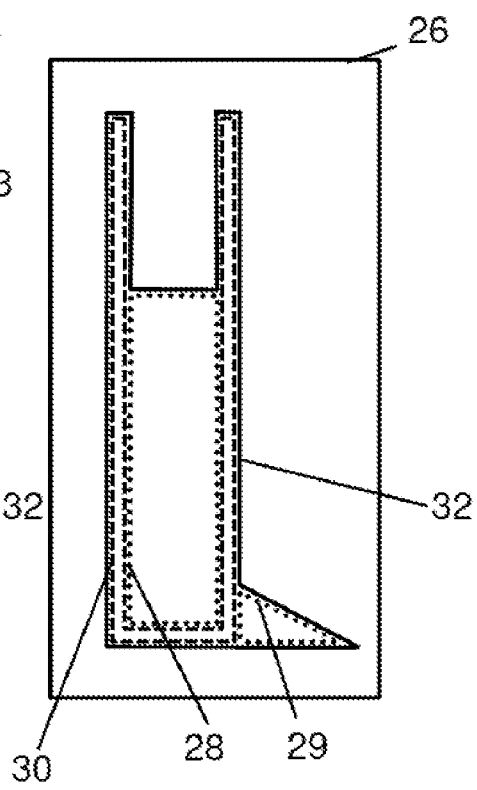

In FIG. 2D, a leaky test liquid container (36) is shown. Accordingly, test liquid (14) can be within the liquid container (36) and outside the liquid container (36). FIG. 2E shows a generated image (26) comprising different absorption strength ranges (27, 31, 33) of the irradiated test liquid container (36) comprising the test liquid (14) as shown in FIG. 2D. A first absorption strength range (27) can relate to the test liquid (14), a second absorption strength range (31) can relate to the test liquid container (36), and a third absorption strength range (33) can relate to air. The first, second, and third absorption strength ranges (27, 31, 33) can be different as indicated by the black, shaded and white areas. FIG. 2F shows the image (26) with two detected liquid outlines (28, 29) of the test liquid (14) as indicated by dotted lines, a carrier outline (30) of the test liquid container (36) as indicated by a dashed line, and an air outline (32) as indicated by a solid line. A test liquid leakage can be determined as two liquid outlines (28, 29) can be detected and one detected liquid outline (29) can be located outside of the detected carrier outline (30).

Figure 3A:
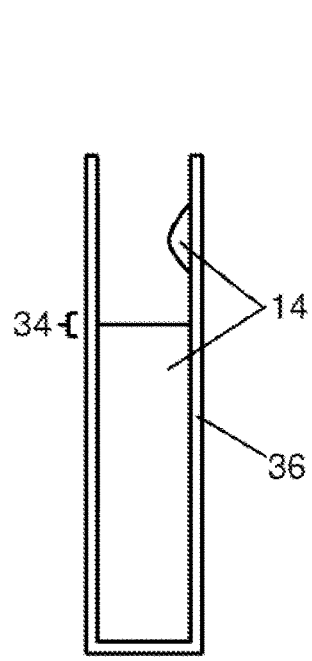
FIGS. 3A-3F illustrate schematic representations of two further embodiments of test liquid features determined by detected liquid outlines, detected carrier outlines, and detected air outlines according to the present disclosure.
Figure 3B:
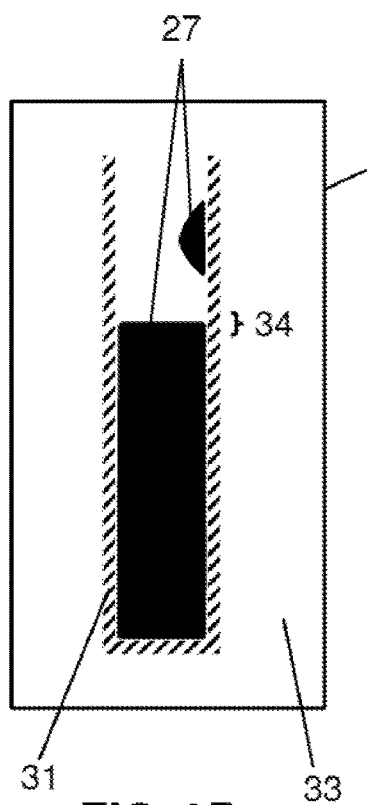
Figure 3C:
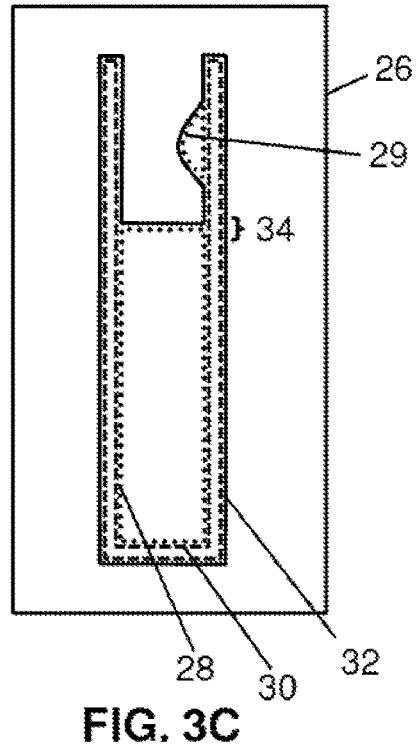

FIG. 3A-F show schematic representations of two further embodiments of test liquid features determined by detected liquid outlines (28, 29), detected carrier outlines (30), and detected air outlines (32). For simplification, FIGS. 3A and D show a laboratory carrier (10) comprising only a test liquid container (36). Alternatively, the laboratory carrier (10) may comprise a test liquid container (36) and a container holder (37) as shown in FIG. 1. As shown in FIG. 3A, a part of the test liquid (14) can be located at the inner surface of the laboratory container (36) and above the liquid level (34) of the test liquid (14) indicating that the laboratory container (36) is not centrifuged. FIG. 3B shows a generated image (26) comprising different absorption strength ranges (27, 31, 33) of the irradiated test liquid container (36) comprising the test liquid (14) as shown in FIG. 3A. A first absorption strength range (27) can relate to the test liquid (14), a second absorption strength range (31) can relate to the test liquid container (36), and a third absorption strength range (33) can relate to air. The first, second, and third absorption strength ranges can be different as indicated by the black, shaded and white areas. FIG. 3C shows the image (26) with detected liquid outlines (28, 29) of the test liquid (14) as indicated by dotted lines, a detected carrier outline (30) of the test liquid container (36) as indicated by a dashed line, and a detected air outline (32) as indicated by a solid line. A non-centrifuged status of the test liquid container (36) can be determined as two liquid outlines (28, 29) can be detected, wherein a larger test liquid outline (28) can comprise a test liquid level (34) and a smaller test liquid outline (29) can be located at the carrier outline (30) and above the test liquid level (34).

Figure 3D:
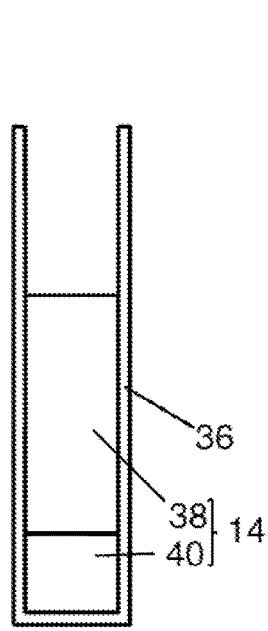
Figure 3E:
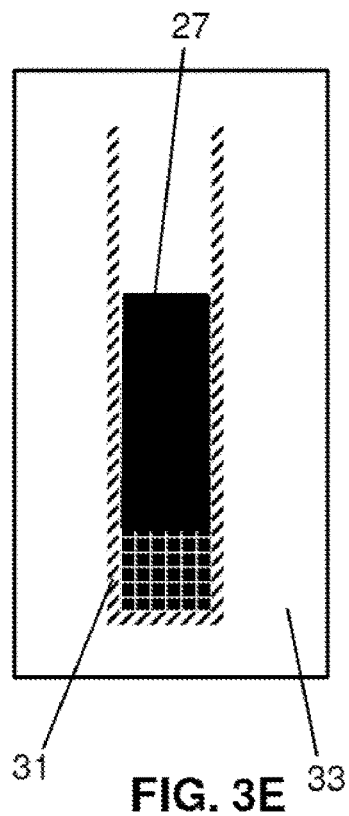
Figure 3F:
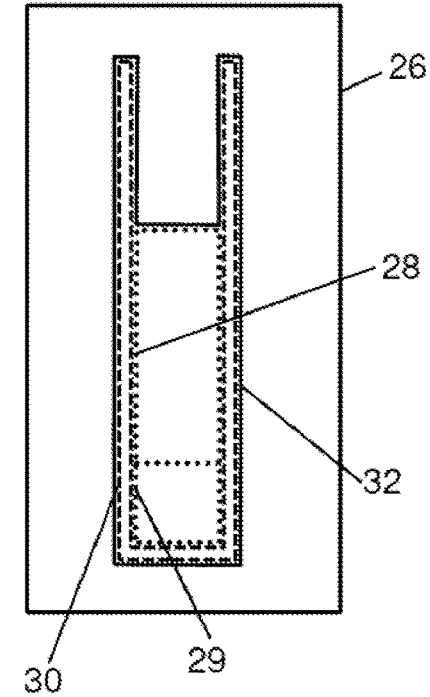

The test liquid (14) in the test liquid container (36) as shown in FIG. 3D can be a biological liquid comprising plasma and red blood cells forming a plasma section (38) and a cruor (40) during centrifugation. The shown test liquid container (36) can be centrifuged. FIG. 3E shows a generated image (26) comprising different absorption strength ranges (27, 31, 33) of the irradiated test liquid container (36) comprising the test liquid (14) as shown in FIG. 3D. A first absorption strength range (27) can relate to the test liquid (14), a second absorption strength range (31) can relate to the test liquid container (36), and a third absorption strength range (33) can relate to air. As further shown in FIG. 3E, the first absorption strength range (27) can comprise two different absorption strength sub-ranges as indicated by a black and gridded area within the first absorption strength range (27). In the shown example, the difference between the two absorption strength sub-ranges can be above a threshold value. Furthermore, the first, second, and third absorption strength ranges can be different as indicated by black/gridded, shaded and white areas. FIG. 3F shows the image (26) with detected liquid outlines (28, 29) of the test liquid (14) as indicated by dotted lines, a detected carrier outline (30) of the test liquid container (36) as indicated by a dashed line, and a detected air outline (32) as indicated by a solid line. A centrifuged status of the test liquid container (36) can be determined as two test liquid outlines (28, 29) with two different absorption strength sub-ranges are detected, wherein the difference between the two absorption strength sub-ranges can be above a threshold value. If the difference between the two absorption strength sub-ranges is below a threshold value, a non-centrifuged status of the test liquid container (36) can be determined (not shown).

Figure 4A:
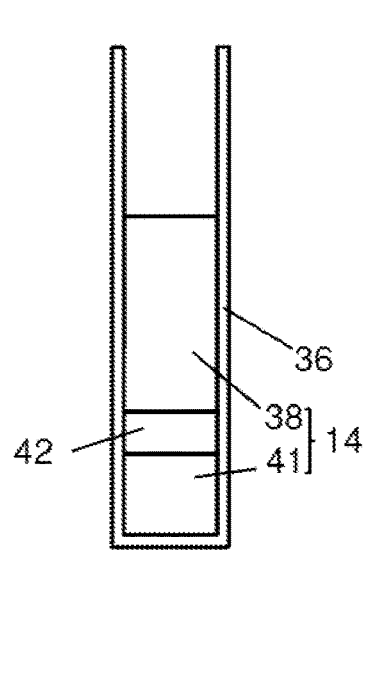
FIGS. 4A-4C illustrate a schematic representation of one further embodiment of a test liquid feature determined by detected liquid outlines, detected carrier outline, and the detected air outline according to the present disclosure.
Figure 4B:
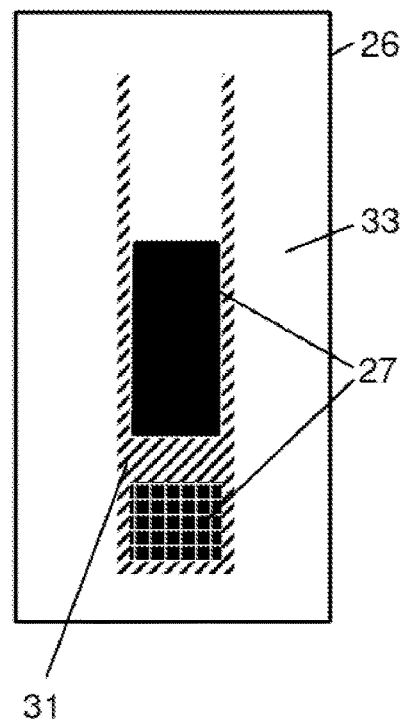
Figure 4C:
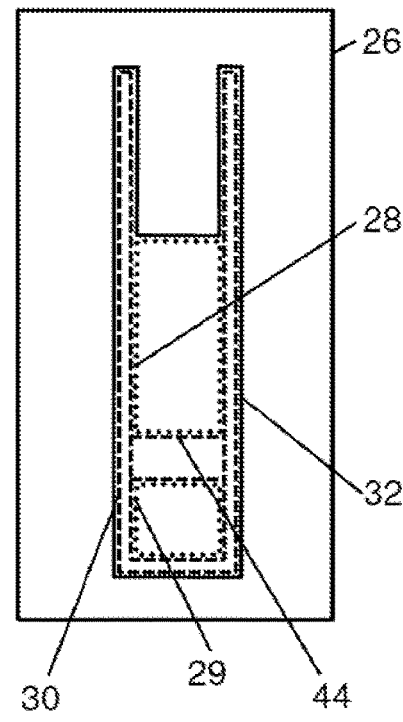

FIG. 4A-C show a schematic representation of one further embodiment of a test liquid feature determined by detected liquid outlines (28, 29), a detected carrier outline (30), and a detected air outline (32). For simplification, FIG. 4A shows a laboratory carrier (10) comprising only a test liquid container (36). Alternatively, the laboratory carrier (10) may comprise a test liquid container (36) and a container holder (37) as shown in FIG. 1. The test liquid container (36) as shown in FIG. 4A can comprise a separator (42) configured to form a physical barrier between serum or plasma (38) and red blood cells (41) of the test liquid (14) during centrifugation. The shown test liquid container (36) can be centrifuged. FIG. 4B shows a generated image (26) comprising different absorption strength ranges (27, 31, 33) of the irradiated test liquid container (36) comprising the test liquid (14) as shown in FIG. 4A. A first absorption strength range (27) can relate to the test liquid (14), a second absorption strength range (31) can relate to the test liquid container (36) and separator (42), and a third absorption strength range (33) can relate to air. The first absorption strength range (27) can comprise two different absorption strength sub-ranges as indicated by a black and a gridded area within the first absorption strength range (27). The first, second, and third absorption strength ranges can be different as indicated by black/gridded, shaded and white areas. FIG. 4C shows the image (26) with detected liquid outlines (28, 29) of the test liquid (14) as indicated by dotted lines, a detected carrier outline (30) comprising a separator outline (44) of the test liquid container (36) and separator (42) as indicated by dashed lines, and a detected air outline (32) as indicated by a solid line. A centrifuged status of the test liquid container (36) can be determined as two liquid outlines (28, 29) can be detected and the two detected liquid outlines (28, 29) can be separated by the separator outline (44). If only one liquid outline is detected and the separator outline (44) is located below or above the detected liquid outline, a non-centrifuged status of the test liquid container (36) can be determined (not shown).

Figure 5:
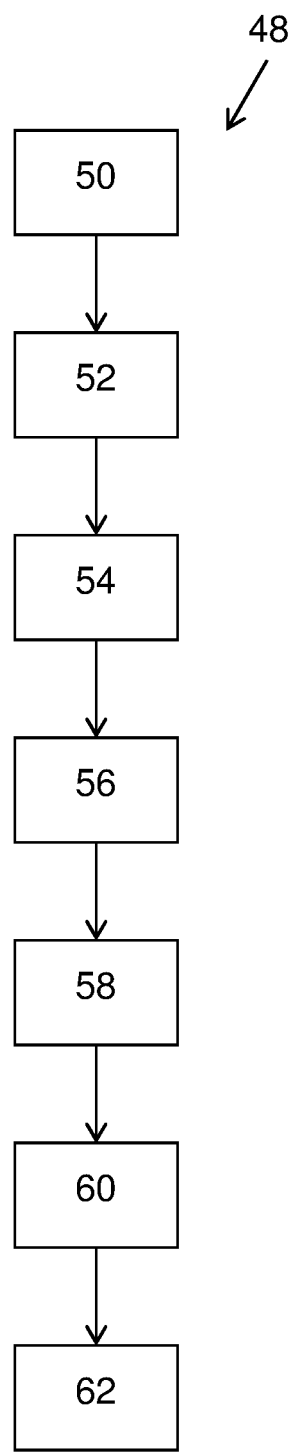
FIG. 5 illustrates a flowchart of an embodiment of the method to process a laboratory carrier based on a feature of a test liquid in the laboratory carrier according to the present disclosure.

FIG. 5 shows a flowchart of an embodiment of the method (48) to process a laboratory carrier (10) based on a feature of a test liquid (14) in the laboratory carrier (10). In step a) (50) of the method (48), the laboratory carrier (10) can be placed in between the terahertz wave source (16) and terahertz detector (18) of the laboratory system (12). The laboratory carrier (10) may be placed by the transport system (21) as shown in FIG. 1. Then, the terahertz wave source (16) can irradiate the laboratory carrier (10) comprising the test liquid (14) with terahertz waves (24) in step b) (52) of the method (48). The terahertz detector (18) can measure intensities of the terahertz radiation reaching the terahertz detector (18) in step c) (54) of the method (48). Based on the measured intensities of the terahertz radiation reaching the terahertz detector (18), the control unit (22) can generate an image (26) comprising different absorption strengths of the irradiated laboratory carrier (10) comprising the test liquid (14) in step d) (56) of the method (48). A first absorption strength range (27) can relate to the test liquid (14), a second absorption strength range (31) can relate to the laboratory carrier (10), and a third absorption strength range (33) can relate to air. As the laboratory carrier (10), the test liquid (14), and air have different absorption properties and absorb the intensity of the terahertz waves differently, the first, second, and third absorption strength ranges can be different. Subsequently, in step e) (58) of the method (48), the control unit (22) can detect a liquid outline (28) of the test liquid (14), a carrier outline (30) of the laboratory carrier (10), and an air outline (32) based on the first, second, and third absorption strength ranges (27, 31, 33). Based on the detected liquid outline (28), the detected carrier outline (30), and the detected air outline (32), the control unit (22) can determine the feature of the test liquid (14) in the laboratory carrier (10) in step f) (60) of the method (48). Finally, in step g) (62) of the method (48), the control unit (22) can control the laboratory carrier processing device (20, 21) to process the laboratory carrier (10) in the laboratory system (12) based on the determined feature of the test liquid (14) in the laboratory carrier (10).

In the preceding description and figures, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Particularly, modifications and variations of the disclosed embodiments are certainly possible in light of the above description. It is therefore to be understood, that within the scope of the appended claims, the present disclosure may be practiced otherwise than as specifically devised in the above examples.

Reference throughout the preceding specification to "one embodiment", "an embodiment", "one example" or "an example", can mean that a particular feature, structure or characteristic described in connection with the embodiment or example is included in at least one embodiment. Thus, appearances of the phrases "in one embodiment", "in an embodiment", "one example" or "an example", in various places throughout this description are not necessarily all referring to the same embodiment or example.

Furthermore, the particular features, structures, or characteristics may be combined in any suitable combinations and/or sub-combinations in one or more embodiments or examples.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method to process a laboratory carrier in a laboratory system based on a feature of a test liquid in the laboratory carrier, wherein the laboratory system comprises the laboratory carrier comprising the test liquid, a terahertz wave source, a terahertz detector, a laboratory carrier processing device, and a control unit communicatively connected to the terahertz wave source, terahertz detector, and laboratory carrier processing device, the method comprising:
   a) placing the laboratory carrier in between the terahertz wave source and terahertz detector;
   b) irradiating, by the terahertz wave source, the laboratory carrier comprising the test liquid with terahertz waves;
   c) measuring, by the terahertz detector, intensities of the terahertz radiation reaching the terahertz detector;
   d) generating, by the control unit, an image comprising different absorption strengths of the irradiated laboratory carrier comprising the test liquid based on the measured intensities of the terahertz radiation reaching the terahertz detector, wherein a first absorption strength range relates to the test liquid, a second absorption strength range relates to the laboratory carrier, and a third absorption strength range relates to air and wherein the first, second, and third absorption strength ranges are different;
   e) detecting, by the control unit, a liquid outline of the test liquid, a carrier outline of the laboratory carrier, and an air outline based on the first, second, and third absorption strength ranges;

f) determining, by the control unit, the feature of the test liquid in the laboratory carrier based on the detected liquid outline, the detected carrier outline, and the detected air outline; and g) controlling, by the control unit, the laboratory carrier processing device to process the laboratory carrier in the laboratory system based on the determined feature of the test liquid in the laboratory carrier.

2. The method according to claim 1, wherein the feature of the test liquid in the laboratory carrier relates to a test liquid level and wherein in step f), the test liquid level is determined based on a common interface of the liquid outline and the air outline.

3. The method according to claim 2, wherein the laboratory carrier comprises a test liquid container configured for receiving, holding, transporting, and/or releasing the test liquid, wherein the test liquid level relates to a test liquid level in a specific test liquid container type, and wherein step f) further comprises determining, by the control unit, the specific test liquid container type based on a dimension and/or a geometric form of the carrier outline, wherein the dimension and/or the geometric form are specific for the specific test liquid container type.

4. The method according to claim 1, wherein the laboratory carrier comprises a test liquid container configured for receiving, holding, transporting, and/or releasing the test liquid, wherein the feature of the test liquid in the laboratory carrier relates to a test liquid volume, wherein the test liquid container comprises a horizontal cross-section, wherein the horizontal cross-section of the test liquid container is circular or quadratic, wherein the detected liquid outline defines a liquid area, and wherein in step f), the liquid volume in the laboratory carrier is determined based on the defined liquid area and the horizontal cross-section.

5. The method according to claim 1, wherein the laboratory carrier comprises a test liquid container configured for receiving, holding, transporting, and/or releasing the test liquid, wherein the feature of the test liquid in the laboratory carrier relates to a test liquid volume, wherein the test liquid container comprises a horizontal cross-section, wherein the horizontal cross-section of the test liquid container is circular or quadratic, wherein the detected liquid outline comprises a test liquid level, wherein in step f), the test liquid level is determined based on a common interface of the liquid outline and the air outline, wherein the test liquid level and the detected carrier outline define a liquid area, and wherein in step f), the liquid volume in the laboratory carrier is determined based on the defined liquid area and the horizontal cross-section.

6. The method according to claim 1, wherein the feature of the test liquid in the laboratory carrier relates to a test liquid leakage, and wherein in step f), the test liquid leakage is determined by localizing one or more detected liquid outlines outside of the detected carrier outline.

7. The method according to claim 1, wherein the feature of the test liquid in the laboratory carrier relates to a centrifugation status of the test liquid in the laboratory carrier, wherein in step e), one or more liquid outlines are detected, wherein the largest liquid outline of the one or more liquid outlines comprises an test liquid level, wherein in step f), the test liquid level is determined by a common interface of the largest liquid outline and air outline, and wherein in step f), the centrifugation status is determined based on the number and localization of the detected liquid outlines in relation to the test liquid level.

8. The method according to claim 1, wherein the feature of the test liquid in the laboratory carrier relates to a centrifugation status of the test liquid in the laboratory carrier, wherein the test liquid is a biological liquid, wherein the biological liquid comprises plasma and red blood cells forming a plasma section outlined by a liquid outline and a cruor outlined by a liquid outline during centrifugation, wherein in step e), one or more liquid outlines are detected, and wherein in step f), the centrifugation status is determined based on the number of detected liquid outlines and the absorption strength sub-ranges within the detected liquid outlines.

9. The method according to claim 1, wherein the feature of the test liquid in the laboratory carrier relates to a centrifugation status of the test liquid in the laboratory carrier, wherein the test liquid is a biological liquid, wherein the laboratory carrier further comprises a separator configured to form a physical barrier between serum or plasma outlined by a liquid outline and red blood cells outlined by a liquid outline during centrifugation, wherein the detected carrier outline comprises a separator outline, wherein in step e), one or more liquid outlines and the separator outline are detected based on the first and second absorption strength ranges, and wherein in step f), the centrifugation status is determined based on the number of detected liquid outlines and based on the localization of the detected separator outline in relation to the one or more liquid outlines.

10. The method according to claim 1, wherein the laboratory carrier processing device is a pipetting device and wherein processing of the laboratory carrier comprises the aspiration and/or dispensing of the test liquid out and/or in the laboratory carrier.

11. The method according to claim 1, wherein the laboratory carrier processing device is a transport system configured to transport the laboratory carrier and wherein processing the laboratory carrier comprises the transportation of the laboratory carrier to a dedicated place of the laboratory system.

12. The method according to claim 1, wherein the test liquid is a biological liquid, a test reagent, or a mixture of a biological liquid and test reagent.

13. A laboratory system, the laboratory system comprising:
- a laboratory carrier comprising a test liquid;
- a terahertz wave source;
- a terahertz detector;
- a laboratory carrier processing device; and
- a control unit communicatively connected to the terahertz wave source, terahertz detector, and laboratory carrier processing device, wherein the laboratory system is configured to execute the steps a) to g) of the method according to claim 1.

14. A non-transitory computer-readable storage medium having stored thereon a computer program product comprising instructions to cause a laboratory system to execute the steps a) to g) of the method according to claim 1, the laboratory system comprising
- a laboratory carrier comprising a test liquid;
- a terahertz wave source;
- a terahertz detector;
- a laboratory carrier processing device; and
- a control unit communicatively connected to the terahertz wave source, terahertz detector, and laboratory carrier processing device, wherein the laboratory system is configured to execute the steps a) to g).

* * * * *